SELF-WINDING ARMING AND STERILIZING MECHANISM FOR A MINE

Filed May 31, 1944 10 Sheets-Sheet 1

Inventors
A. H. Schwarz
R. W. Wallace
By W. Elmer Jones
Attorney

SELF-WINDING ARMING AND STERILIZING MECHANISM FOR A MINE

Filed May 31, 1944 10 Sheets-Sheet 2

Inventors
A. H. Schwarz
R. W. Wallace

By W. Glenn Jones

Attorney

SELF-WINDING ARMING AND STERILIZING MECHANISM FOR A MINE

Filed May 31, 1944 10 Sheets-Sheet 3

Inventors
A. H. Schwarz
R. W. Wallace

By W. Glenn Jones

Attorney

Inventors
A. H. Schwarz
R. W. Wallace
By [signature]
Attorney

Inventors
A. H. Schwarz
R. W. Wallace
By W. Glenn Jones
Attorney

SELF-WINDING ARMING AND STERILIZING MECHANISM FOR A MINE

Filed May 31, 1944 10 Sheets-Sheet 6

Inventors
A. H. Schwarz
R. W. Wallace

By W. Glenn Jones
Attorney

Dec. 31, 1963 A. H. SCHWARZ ET AL 3,115,834

SELF-WINDING ARMING AND STERILIZING MECHANISM FOR A MINE

Filed May 31, 1944 10 Sheets-Sheet 7

Inventors
A. H. Schwarz
R. W. Wallace

By W. Glenn Jones

Attorney

SELF-WINDING ARMING AND STERILIZING MECHANISM FOR A MINE

Filed May 31, 1944 10 Sheets-Sheet 8

Inventors

A. H. Schwarz

R. W. Wallace

By W. Glenn Jones

Attorney

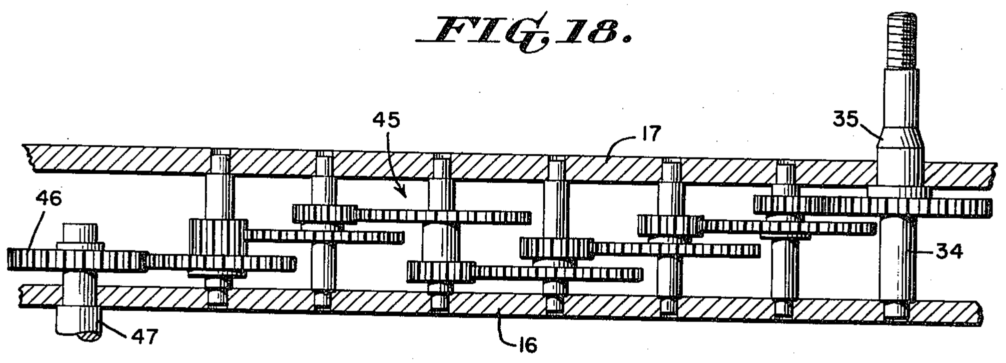
FIG. 18.
FIG. 19.
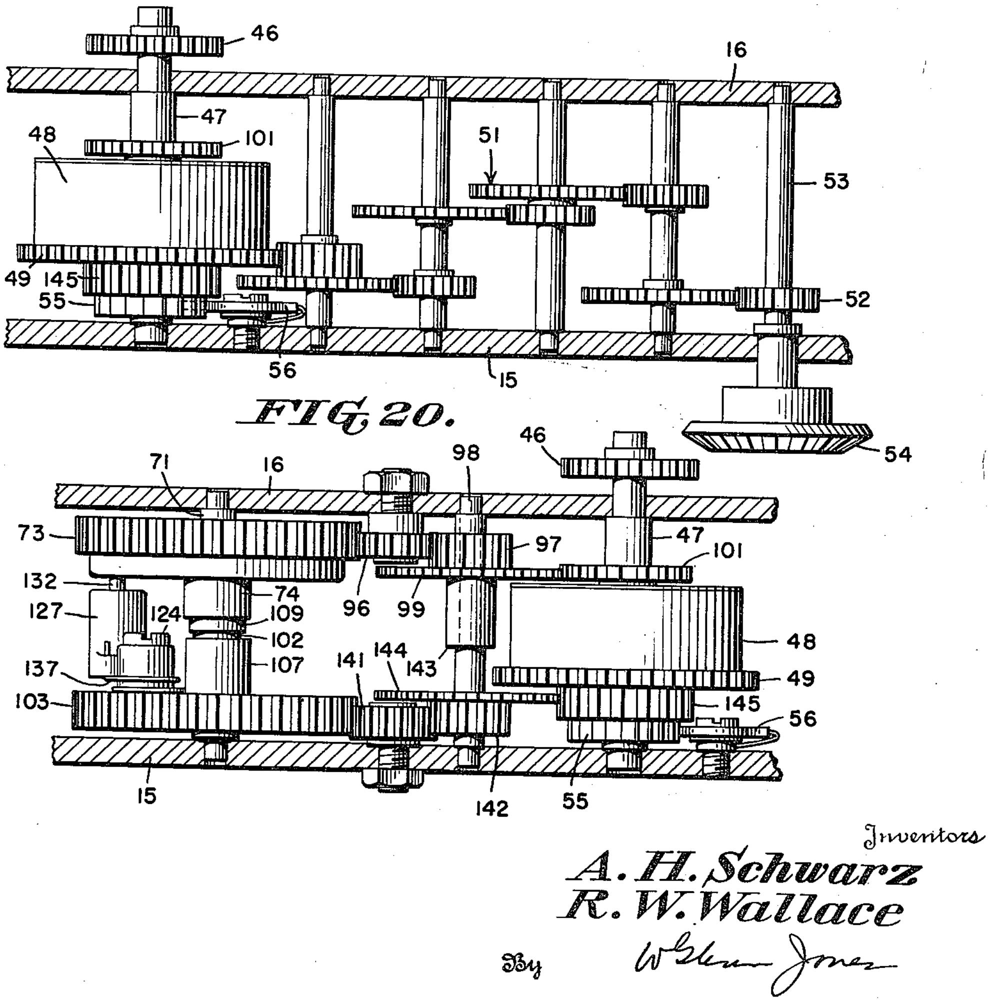
FIG. 19, FIG. 20.
Inventors
A. H. Schwarz
R. W. Wallace
By W. Glenn Jones
Attorney

SELF-WINDING ARMING AND STERILIZING MECHANISM FOR A MINE

Filed May 31, 1944

10 Sheets-Sheet 10

Inventors
A. H. Schwarz
R. W. Wallace
By W. Glenn Jones
Attorney

3,115,834
SELF-WINDING ARMING AND STERILIZING MECHANISM FOR A MINE

Arthur H. Schwarz and Roger W. Wallace, Washington, D.C., assignors to the United States of America as represented by the Secretary of the Navy Filed May 31, 1944, Ser. No. 538,174
12 Claims. (Cl. 102—18)
(Granted under Title 35, U.S. Code (1952), sec. 266)

Figure 1:
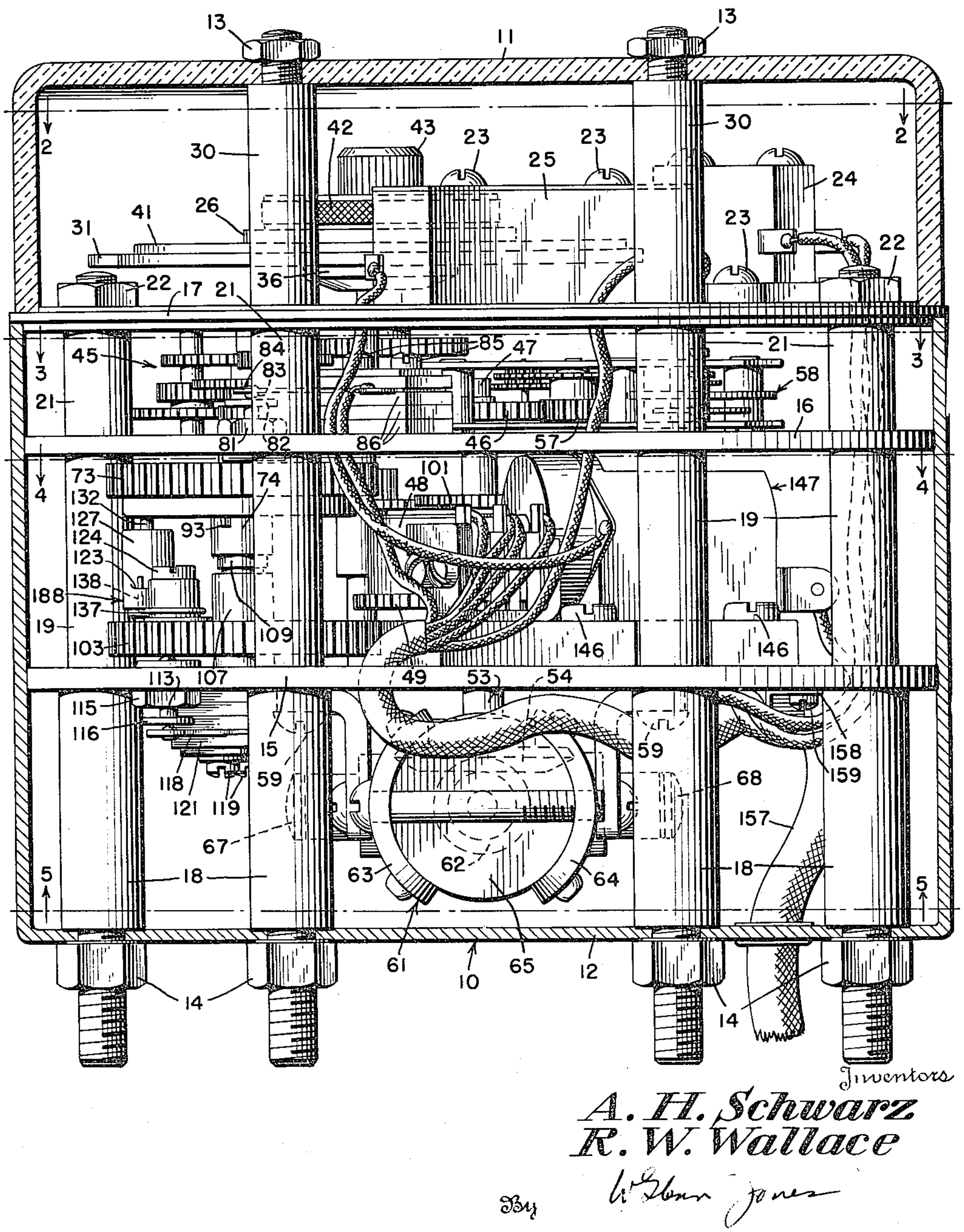

This invention relates to time delay switch mechanisms in which the delay is accomplished by an escapement device adapted to be operated continually for a relatively long period of time. More specifically, the invention relates to a self-winding time delay mechanism having a pair of cam actuated circuit controlling devices particularly adapted for delaying the arming of a mine for a relatively long period of time after the mine has been planted and for causing the sterilization of the mine at the expiration of a considerably longer period of time, in which the power required for the operation of the clock mechanism is obtained from a spring motor which is rewound periodically at predetermined intervals of time by an electric motor operatively connected thereto.

In devices of this class heretofore proposed for arming and sterilizing a mine it has been the general practice to employ various time delay mechanisms such, for example, as single wind clock mechanisms, electrolytic and water soluble devices and the like adapted to operate a circuit control device in time delayed relation with respect to the planting of the mine. Such devices have not proved entirely satisfactory under all conditions of service for the reason that the single wind clock mechanism may fail to perform a cycle of operations sufficiently to operate the circuit closing mechanism by reason of the decrease in power applied to the escapement mechanism during the latter portion of the spring unwinding cycle and for this reason such devices have not proved entirely satisfactory for use with mines in which the sterilization thereof is delayed for a relatively long period of time such, for example, as several months.

In regard to the aforesaid water soluble devices, these devices are not, in general, adapted to effect relatively long delays, such, for example, as a delay of several days or weeks, as the case may be, before the mine is sterilized. Furthermore, in electrolytically controlled devices for arming and sterilizing a mine, the rate of electrolytic action of these devices varies in accordance with several controlling factors such, for example, as the temperature of the water within which the mine is planted and for this reason the period of elapsed time between the planting of the mine and the sterilization thereof may vary considerably in accordance with variations in each of the controlling factors, particularly when the sterilization of the mine is delayed for several months after the mine is planted.

The device of the present invention retains all of the advantages of the foregoing devices and possesses none of the foregoing disadvantages of the prior devices. In accordance with the present invention the delayed arming and sterilization device comprises a spring driven escapement mechanism of simple and rugged construction in which the power for the operation of the mechanism is stored in a mainspring or spring motor by an electric motor which rewinds the spring whenever the spring has unwound a predetermined number of turns, thereby providing an arrangement in which the most effective use of the spring is employed for the operation of the mechanism and in which the spring is periodically rewound before the spring has unwound sufficiently to impair the reliability of the device. As will hereinafter appear in more complete detail, the electric motor employed for rewinding the spring is normally disconnected from a source of electrical energy and set in operation only when the spring motor has unwound a predetermined number of turns or fractional portion thereof, a new and improved motor control switch mechanism being employed to maintain the motor continuously connected to the electrical source of power until the spring motor has rewound to an initial wound or starting position.

The device is also provided with a new and improved cam mechanism comprising a pair of adjustable cam devices in geared connection with the aforesaid escapement mechanism and adapted to operate a pair of circuit controlling devices in predetermined time delayed relation controlled by the setting of the cam devices. By employing a pair of adjustable cam devices in the manner disclosed herein for controlling the operation of a pair of circuit controlling devices, an arrangement is provided in which the arming of a mine in predetermined time delayed relation after the planting thereof and the sterilization of the mine several weeks or months thereafter may be effected with a high degree of accuracy.

The device of the present invention possesses an additional advantage over other types of electrically controlled escapement mechanisms such, for example, as electrically operated clocks for automobiles, by employing an electric motor for rewinding a spring motor at infrequent intervals such, for example, as once every fourteen hours, thereby causing a substantial saving in the electrical power required for maintaining the escapement mechanism in operation. The device also possesses an additional advantage over other types of electrically controlled clock mechanisms by reason of the rugged construction and arrangement of the parts whereby the device is adapted to withstand the severe shock received during the planting of the mine without injury or damage thereto.

One of the objects of the present invention is the provision of a new and improved device for controlling a plurality of circuits in which the circuit control means is delayed by a self-winding spring driven escapement mechanism having means including an electric motor for rewinding the spring periodically at infrequent intervals whenever the spring has unwound a predetermined number of turns from an initial wound position.

Another of the objects is a new and improved arming and sterilizing device for a mine adapted to be operated by energy stored in a mainspring by an electric motor at predetermined intervals of time.

Another object is to provide a self-winding spring driven arming and sterilizing device for a mine in which an electric motor is connected to a source of power when the spring has been unwound to a predetermined degree thereby to rewind the spring and disconnect the motor from the source of electrical power when the spring has been rewound.

Another object is the provision of a new and improved arming and sterilizing device for a mine in which means are provided for closing an arming circuit when a predetermined period of time has elapsed after the mine has been planted and for sterilizing the mine when an additional period of time of relatively long duration has elapsed.

A still further object is the provision of a new and improved arming and sterilizing device for a mine which is economical to manufacture, positive in action and which possesses all the qualities of reliability and durability in service.

Figure 2:
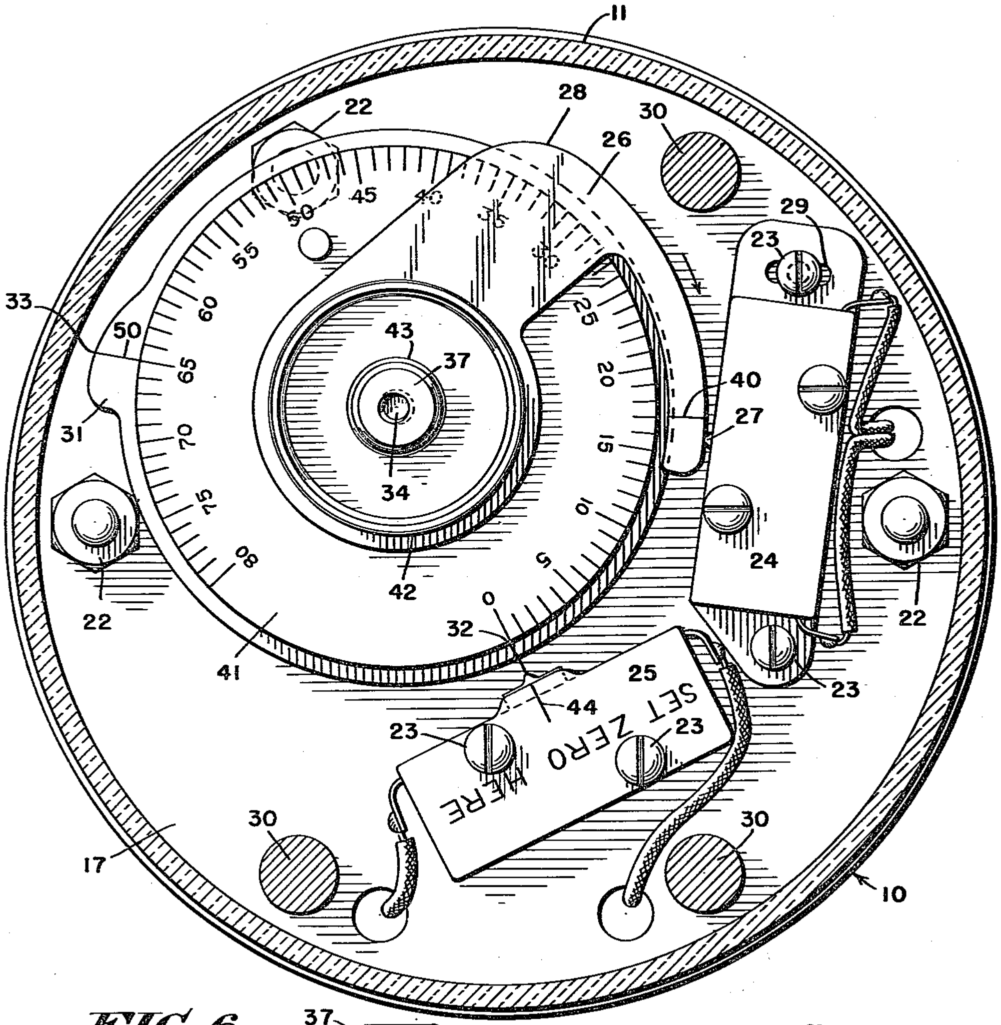
Figure 6:
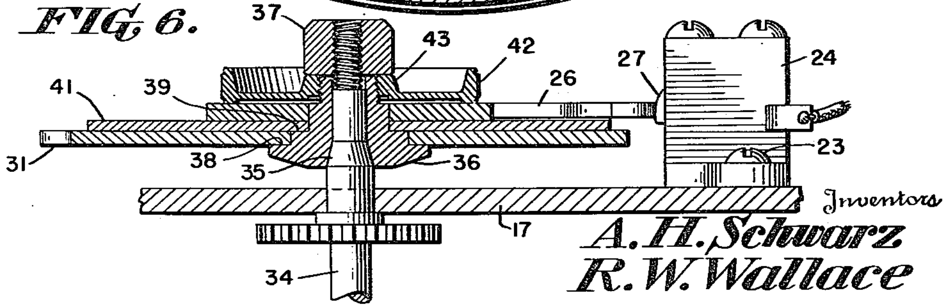
Figure 3:
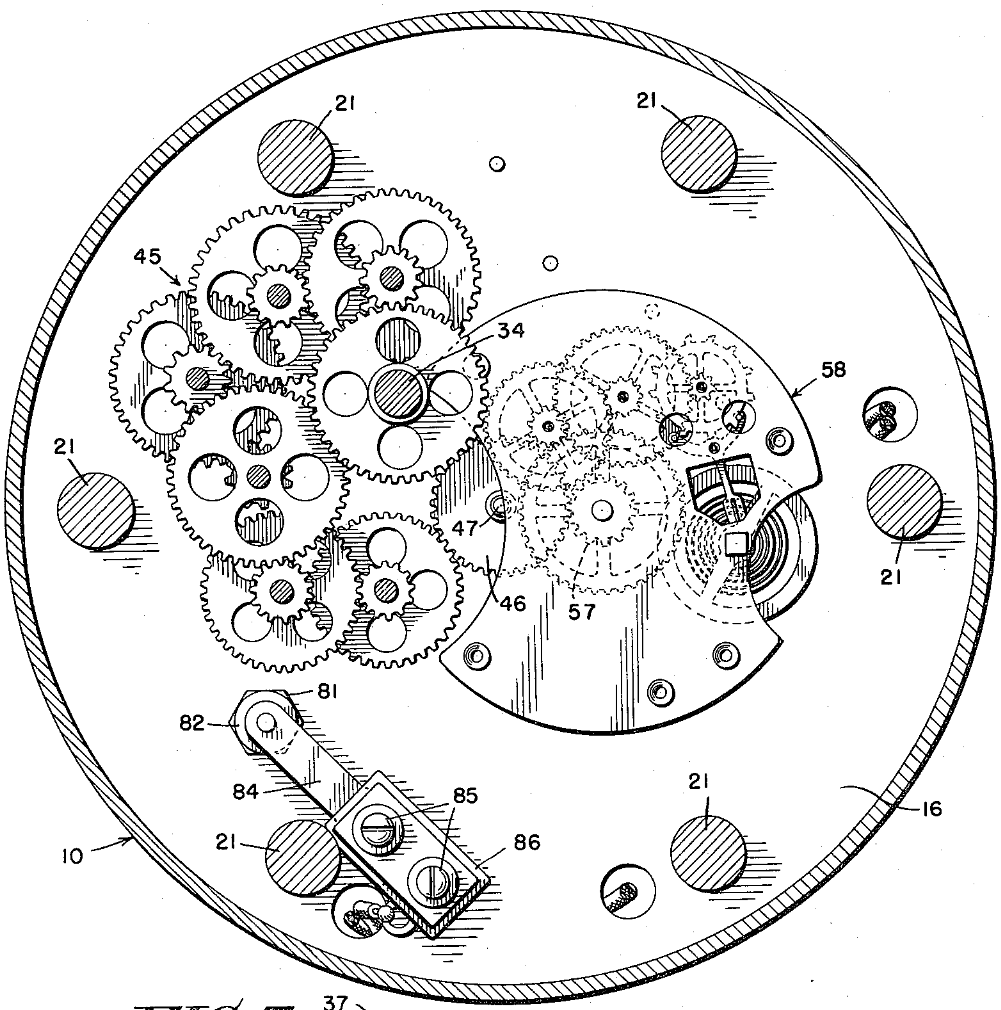
Figure 7:
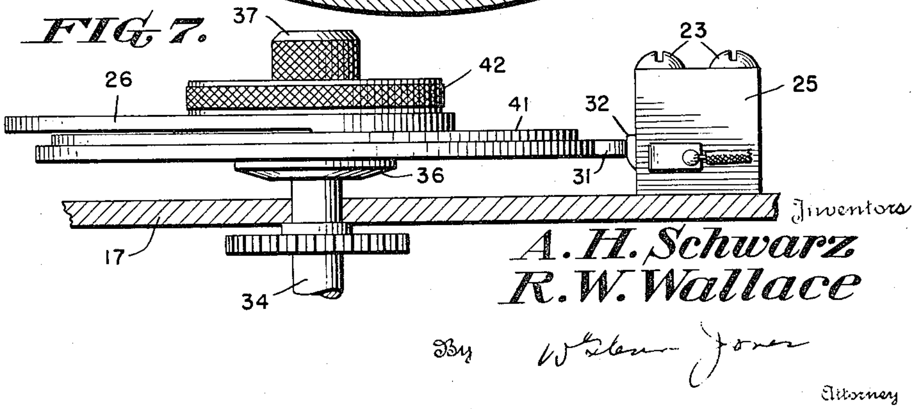
Figure 4:
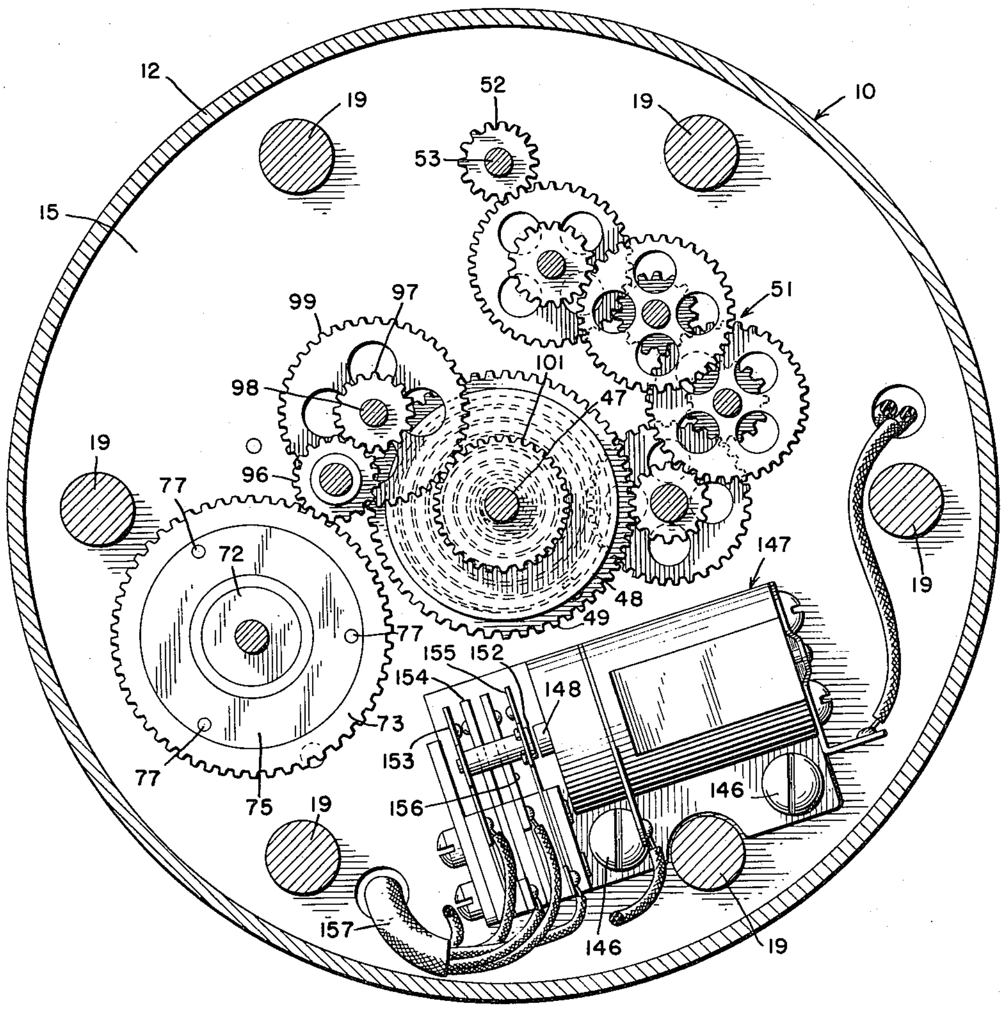
Figure 5:
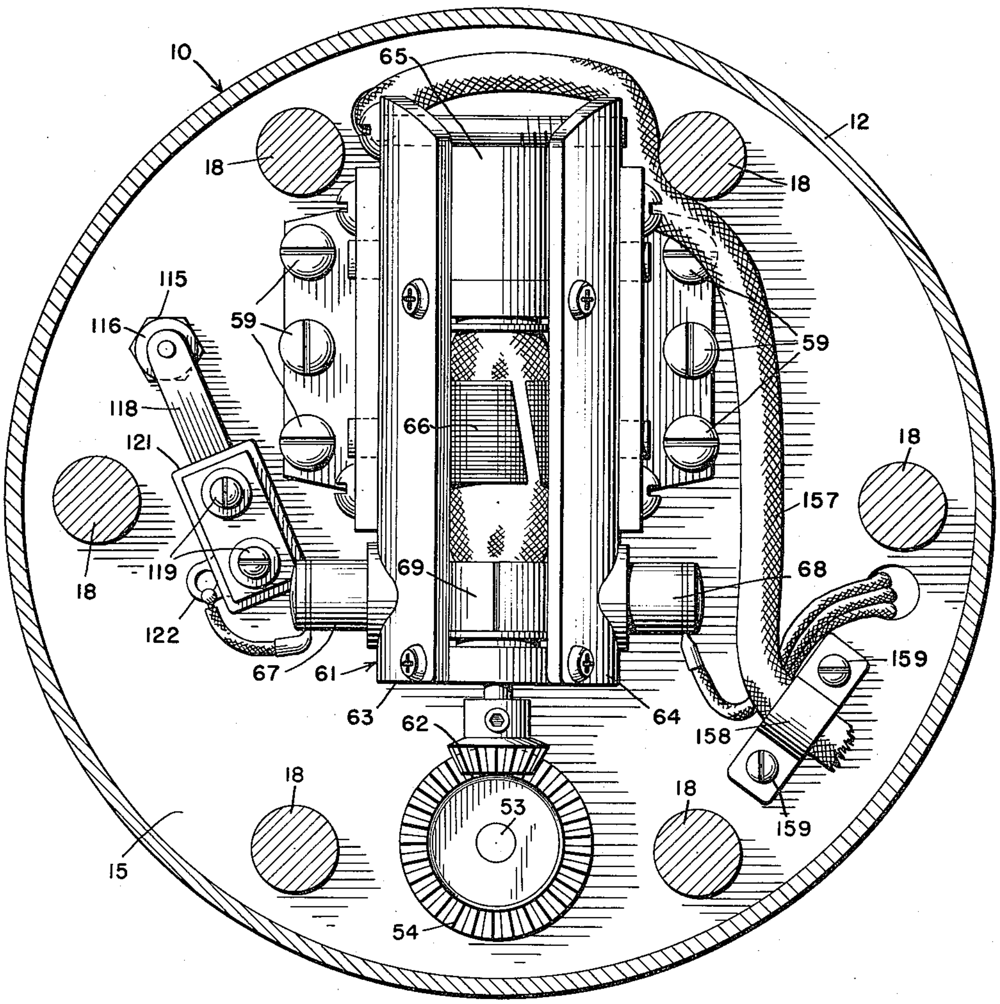
Figure 8:
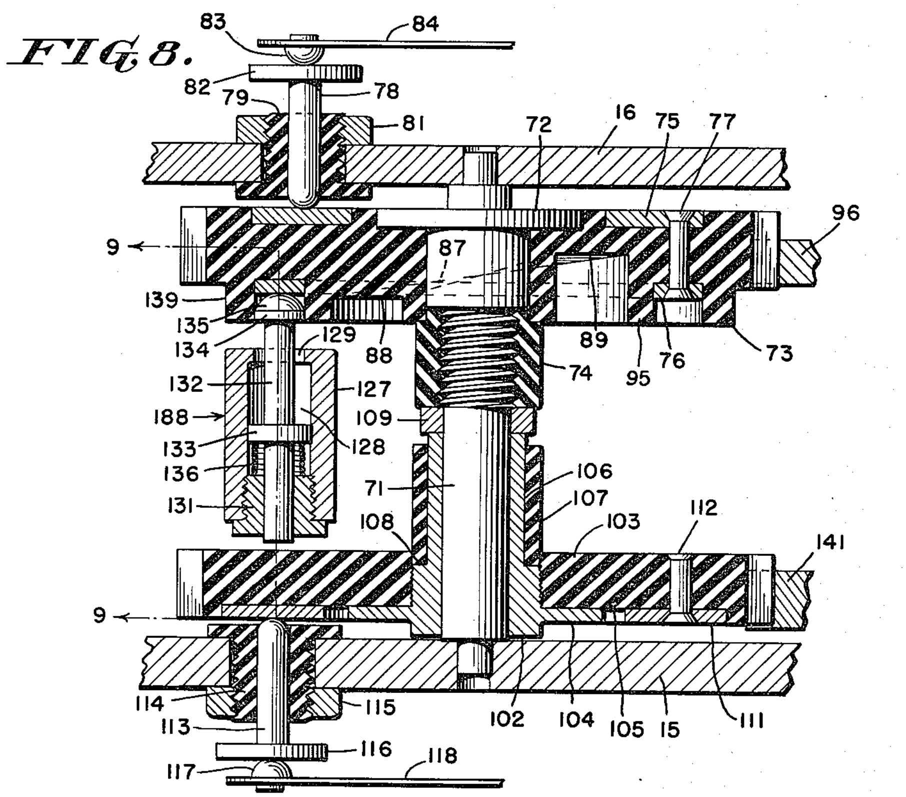
Figure 9:
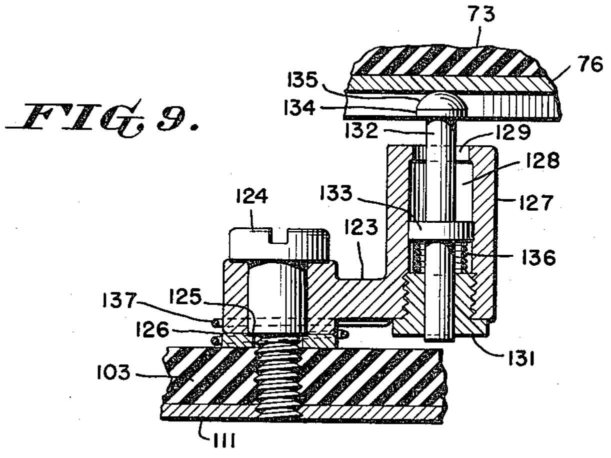
Figure 10:
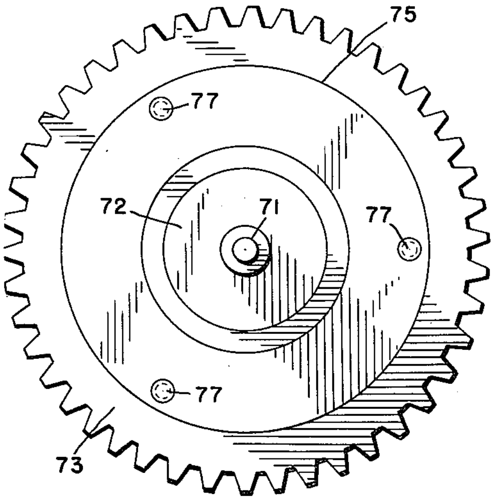
Figure 11:
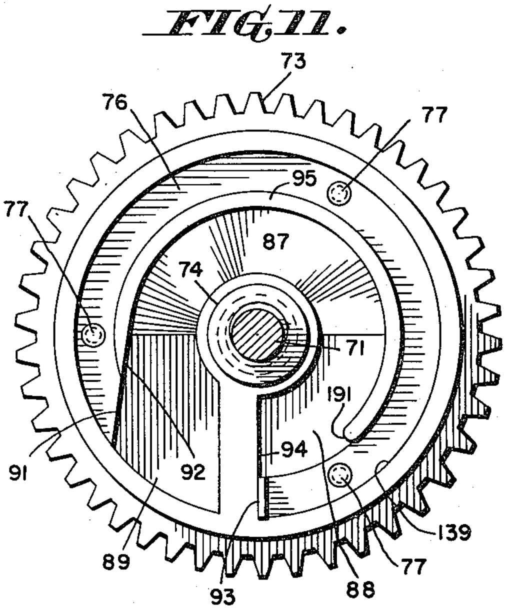
Figure 12:
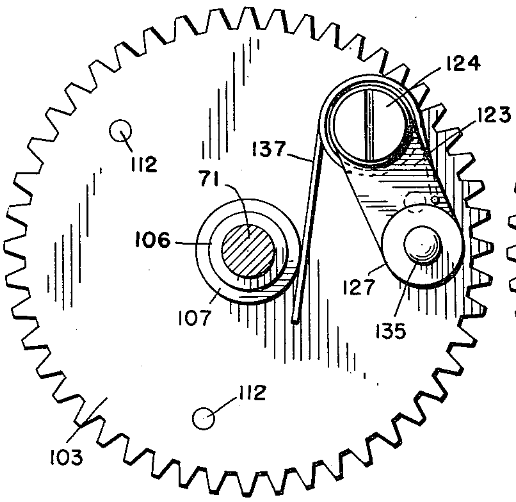
Figure 13:
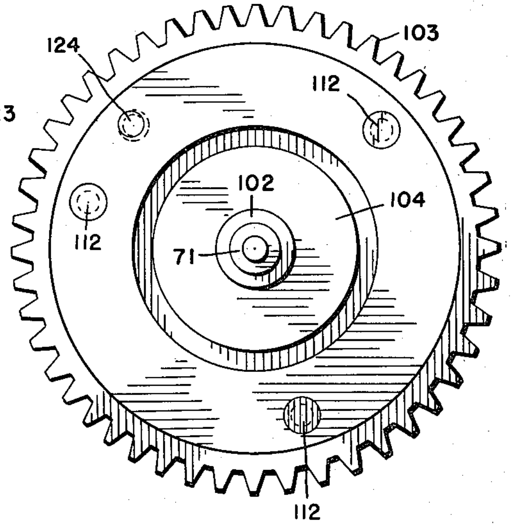
Figure 21:
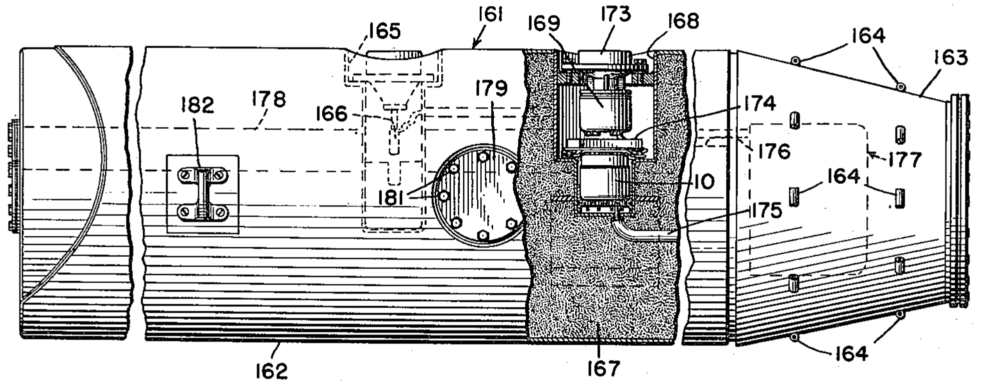
Figure 22:
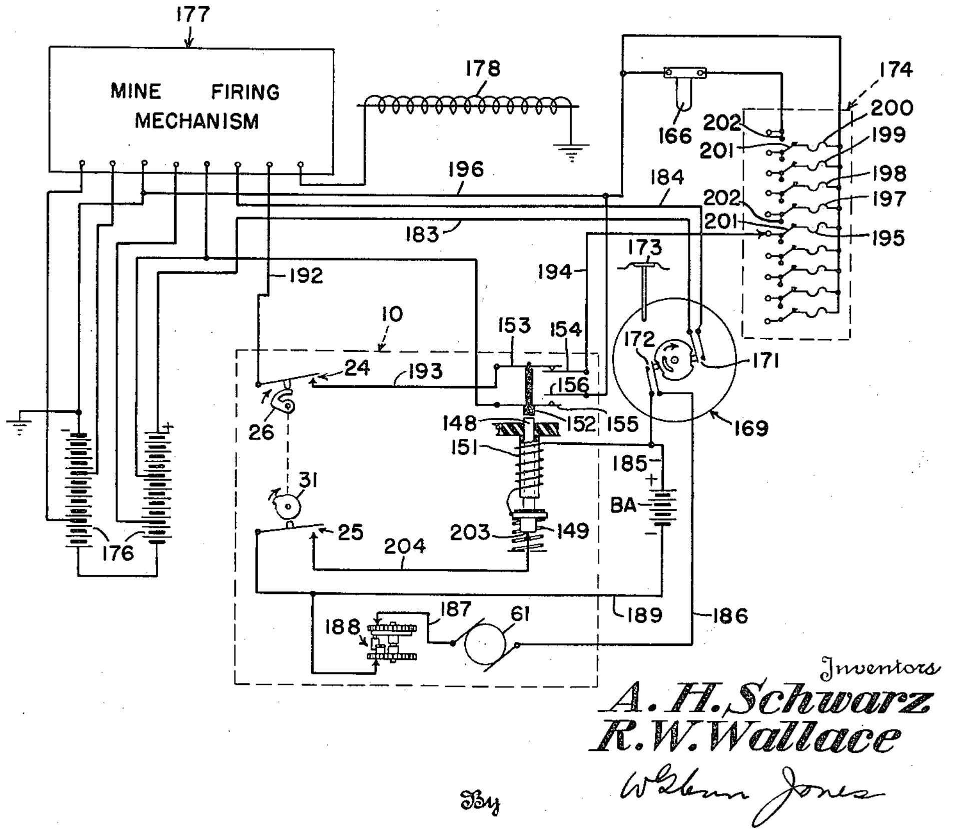

Still other objects, advantages and improvements will be apparent from the following description taken in connection with the accompanying drawings of which:

FIG. 1 is a view of the device in elevation with the case in section;

FIG. 2 is a view taken along the line 2—2 of FIG. 1;
FIG. 3 is a view taken along the line 3—3 of FIG. 1;
FIG. 4 is a view taken along the line 4—4 of FIG. 1;
FIG. 5 is a view taken along the line 5—5 of FIG. 1;
FIG. 6 is a sectional view of the switch operating mechanism and the arming switch operated thereby;
FIG. 7 is an elevational view of the switch operating mechanism and the sterilizing switch operated thereby;
FIG. 8 is a sectional view, with parts in elevation, of the motor control switch mechanism;
FIG. 9 is a sectional view taken substantially along the line 9—9 of FIG. 8;
FIG. 10 is a top plan view of the upper gear of the motor control switch mechanism;
FIG. 11 is a bottom plan view of the gear of FIG. 10 with the gear in section;
FIG. 12 is a top plan view of the lower gear of the switch control mechanism of FIG. 8 with the shaft in section;
FIG. 13 is a bottom plan view of the gear of FIG. 12;
FIGS. 14 to 17 are diagrammatic views showing the operation of the motor control switch mechanism at different portions of a cycle of operations thereof;
FIG. 18 shows in diagrammatic form the driven gear train employed for operating the arming and sterilizing switch mechanisms;
FIG. 19 shows in diagrammatic form the gear train employed for winding the spring motor;
FIG. 20 shows the pair of gear trains employed for actuating the motor control switch mechanism;
FIG. 21 is a view, partly in section and partly broken away, of a mine employing the device of the present invention; and
FIG. 22 shows in diagrammatic form a complete electrical system employing the device of the present invention and suitable for use with the mine of FIG. 21.

Referring now to the drawings specifically in which like numerals of reference are employed to designate like parts throughout the several views, and more particularly to FIG. 1 thereof, there is shown thereon an arming and sterilizing device indicated generally by the numeral 10 having a pair of covers 11 and 12 secured thereto as by the nuts 13 and 14 respectively. The device comprises a plurality of plates 15, 16 and 17 maintained in predetermined spaced and parallel relation with respect to one another by a plurality of spacing members or studs 18, 19 and 21 and nuts 22 threaded on the studs 21, the spacing members 18, 19 and 21 being preferably threaded together. Certain of the studs 21 have threaded thereon, in lieu of the nuts 22, the spacing members or studs 30 upon which the nuts 13 are threaded. Secured to the plate 17 as by the screws 23 are a pair of switch devices 24 and 25, FIG. 2, employed, according to the preferred embodiment of the invention, for arming and sterilizing a mine respectively. The switch 24 is maintained in an open position by a cam member 26 until the cam has rotated sufficiently to permit the movable element 27 of the switch 24 to be moved outwardly to a circuit closing position, the closure of the switch 24 occurring when the element 27 is in engagement with the point 28 on the cam 26. The switch 24, it will be noted, is provided with a slotted portion 29 within which one of the screws 23 is disposed whereby the switch may be initially adjusted to a position such that the switch opens as the point 28 of the cam 26 engages the movable element 27 thereof.

The switch 25 is normally open and adapted to be closed as the cam member 31 moves into engagement with the movable element 32 of the switch sufficiently to cause the switch contacts to close, closure of the switch occurring as the movable element 32 engages the cam element 31 at the point 33 thereof.

The cam elements 26 and 31 are supported for rotation by a shaft 34 journaled by the plates 16 and 17, the shaft being provided with a tapered portion 35, FIG. 6, adapted to receive and engage a complementary tapered portion within a collar 36 as a knurled nut 37 threaded on the shaft 34 is tightened. The collar 36 is provided with a shoulder 38 with which the cam member 31 is in registered engagement, and a second shoulder 39 in registered engagement with a dial 41 having a series of uniformly spaced graduations and indicia therefor corresponding to the elapsed time in days for each graduation to move opposite the initial starting point. The cam member 26 is maintained in continuous abutting relation with the dial 41 by a knurled nut 42 threaded on the shoulder 36 and having a hub 43 thereon adapted to be engaged by the knurled nut 37. By reason of the provision of the reference marks 40 and 50 on the cam elements 26 and 31 respectively, an arrangement is provided in which the elements 31, 41 and 26 may be set in predetermined angular relation with respect to one another and secured in the set position by the nut 42, a nut 37 being provided for securing the cam assembly to the shaft 34 with the zero scale division of the dial 41 opposite a reference mark 44 on the switch 25 corresponding to the initial set position of the cam assembly. Preferably, though not necessarily, the cam member 31 is secured to the collar 36 in any suitable manner, thereby to facilitate clamping the cam elements 26 and 31 and the dial in the adjusted position with respect to one another by the nut 42. The shaft 34 is connected by a gear train 45 to a gear 46, FIG. 18, secured to a shaft 47 journaled between the plates 16 and 15, to which is secured one end of a mainspring disposed within the spring barrel 48, FIG. 19, to which the other end of the spring is secured in any well-known manner. The gear train 45 preferably is arranged to cause the shaft 34 to revolve at the rate of one revolution during a period of one hundred days.

The spring barrel 48 is provided with a gear 49, FIG. 19, in engagement with a gear train indicated generally by the numeral 51 to which is connected a gear 52 secured to a shaft 53 journaled between the plates 15 and 16 and having a winding gear 54 secured thereto. There is also provided on the spring barrel 48 a ratchet 55 adapted to be engaged by the spring actuated pawl 56 and prevent movement of the spring barrel in the reverse direction when the winding force is removed from the gear 54.

The gear 46 is also in engagement with a gear 57, FIG. 3, associated with an escapement mechanism indicated generally by the numeral 58 and secured to the plate 16.

Secured to the plate 15 as by the screws 59 is an electric motor 61, FIG. 5, having a gear 62 thereon in meshed engagement with the winding gear 54, the motor being preferably of the type having a pair of pole pieces 63 and 64 adapted to set up a strong magnetic field therebetween by reason of the provision of a permanent magnet 65 with which the pole pieces are connected, an armature 66 being arranged between the pole pieces and adapted to be rotated when current from a source of electrical power is applied to the brushes 67 and 68 in continuous electrical engagement with a commutator 69.

The motor is adapted to be operated when the mainspring within the spring barrel has unwound a predetermined number of turns and remains operated until the spring is rewound. The switching mechanism for controlling the operation of the motor comprises a shaft 71 journaled between the plates 15 and 16, FIGS. 8 and 20, having a collar 72 thereon adapted to receive and engage a geared switching member 73 composed of suitable insulating material such, for example, as Bakelite, the gear being clamped to the collar 72 by a nut 74 threaded on the shaft 71. The member 73 is provided with an annular electrical conducting ring 75 and a discontinuous conducting ring 76 secured thereto as by a plurality of rivets 77, FIGS. 10 and 11, whereby the conducting rings are secured to the gear 73 and maintained in continuous electrical connection with each other. The ring 76 is adapted to be engaged by a plunger 78 slidably arranged within a bearing member 79 secured to the plate 16 by the nut 81, the bearing member being composed of insulating material sutiable for the purpose such, for example, as Bakelite thereby to prevent an electrical connection between the plunger 78 and the plate 16. The plunger is preferably provided with a head 82 adapted to be engaged by the contact 83 on the contact spring 84. The contact spring 84 is secured to the plate 16 as by the screws 85 and insulated therefrom as by the insulating devices 86 and provided with a terminal connection for a conductor thereby to establish an external circuit connection to the contact 83.

The switching device 73 is also provided with a recessed portion 87 arranged generally concentric with respect to the ring 76 and tapering or increasing in depth from the portion 88, which is of a depth substantially coincident with the depth of the annular member 76 below the outer surface of the switching device 73, to a depth at 89 considerably below the depth of the ring 76. One end portion of the ring 76 is tapered as at 91 thereby to bring the end of the ring into vertical alinement with a cam surface 92 formed within the recessed portion 89 of the switching device 73, the other end of the ring 76 being preferably bent outwardly as at 93 in abutting relation with a shoulder 94 formed within the switching device. The ring 76, it will be noted, is recessed within the switching device 73 and separated from the tapered recess including the recessed portions 87 and 89 by a circular baffle section 95 formed within the switching device 73, the purpose of which will be more clearly apparent as the description proceeds. The switching device 73 is geared to an idle gear 96 in toothed engagement with a gear 97 secured to a sleeve 143 rotatably mounted on shaft 98 journaled within the plates 15 and 16. Sleeve 143 rests on a shoulder formed on shaft 98 and extends upwardly through gear 97 to plate 16. Gear 97 is provided with a gear 99 secured thereto in meshed engagement with a gear 101 secured to the shaft 47. An arrangement is thus provided in which the switching device 73 moves slowly and continually in one direction during the entire time the escapement mechanism of the arming and sterilizing device is in operation.

There is also rotatably mounted upon the shaft 71, a sleeve 102 having a gear 103 of suitable insulating material such, for example, as Bakelite secured thereto in any suitable manner, as by threading the parts together, whereby a collar or flange 104 on the sleeve 102 is in secured abutting relation with respect to the bottom of a recess or well 105 formed within the gear. The sleeve 102 has a reduced cylindrical portion 106 adapted to receive and support a tubular member 107 arranged thereon in abutting relation with a shoulder 108 on the sleeve 102. Substantial endwise motion of the gear 103 is prevented by a washer 109 arranged on the shaft 71 intermediate the sleeve 102 and nut 74, the washer being of insufficient thickness to prevent rotative movement of the gear 103 with respect to the shaft 71. There is also arranged within the recess 105, a conducting ring 111 secured thereto as by the rivets 112 and adapted to be continuously engaged by a plunger 113 slideably disposed within the bearing member 114, the bearing member being composed of insulating material and secured to the plate 15 as by the nut 115. The plunger 113 is provided with a head 116 adapted to be engaged by the contact 117 of the contact spring 118 secured to the plate 15 as by the screws 119, FIG. 5, a plurality of insulating devices 121 being employed to insulate the contact spring 118 from the plate. The contact spring 118 is provided with a terminal 122 having a conductor connected thereto for establishing an external electrical connection to the contact 117.

A contact arm 123, FIG. 9, is pivotally secured to the gear 103 as by the screw 124, the screw also engaging the contact ring 111 thereby to establish an electrical circuit between the contact ring and the arm 123. The screw 124, it will be noted, is preferably provided with a shoulder 125 in registered engagement with a washer 126 whereby the arm 123 is supported for rotative movement with respect to the gear 103 by the screw 124. The arm 123 is provided with a cylindrical upstanding portion 127 recessed as at 128 and 129 respectively and provided with a bearing member 131 secured thereto as by threading the parts together. A rod or plunger 132 is slideably arranged within the bearing 131 and provided with a collar 133 adapted to slide within the recess portion 128 of the arm 123. The plunger 132 is also provided with an enlarged end portion or head 134 having a contact member 135 secured thereto and adapted to be maintained in continuous engagement with the electrical conducting ring 76 or the recessed portions 87, 88, 89 of the switching device 73, as the case may be, by a spring 136 arranged between the collar 133 and the bearing member 131. The arm 123 is continuously urged outwardly from the shaft 71 by a spring 137 having one end thereof disposed within an aperture 138, FIG. 1, within the arm 123 and the other end thereof in engagement with a sleeve 106 composed of insulating material. An arrangement is thus provided in which the arm 123 is continuously urged outwardly from the shaft 71 and insulated therefrom, the outward movement of the arm being restrained by the circular raised portion 139 of the switching device 73 or the circular baffle section 95 thereof, as the case may be.

The gear 103 is in meshed engagement with an idle gear 141, FIG. 20, the idle gear also being in meshed engagement with a gear 142 mounted on the shaft 98. A gear 144 is also secured to shaft 98 and is in meshed engagement with a gear 145 secured to the spring barrel 48 thereby providing an arrangement in which rotative movement of the spring barrel during each winding operation of the spring causes the gear 103, and the arm 123 supported thereby, to rotate continuously while the mainspring is being rewound by the motor and to come to rest when the operating circuit to the motor is interrupted at the completion of each winding operation. The specific manner in which this intermittent movement of the gear 103 and contact arm 123 supported thereby is employed to control the motor operating circuit will become more clearly apparent as the description proceeds.

There is also secured to the plate 15 as by the screws 146 a heat controlled relay indicated generally by the numeral 147 of any type suitable for the purpose such, for example, as the heat controlled relay described and claimed in the copending application of John F. Toomey et al., for Heat Controlled Relay, Serial No. 525,610, filed March 8, 1944, now Patent No. 2,961,958, the relay comprising a plunger 148 continuously urged outwardly toward a moved position by a spring 149, FIG. 22, and normally restrained from outward movement by a low fusing alloy adapted to be melted in response to a flow of current through a heat coil 151. When the plunger 148 moves outwardly, a spacing member 152 composed of suitable insulating material is engaged thereby, causing the contact spring 153 to be disengaged from contact spring 154 and contact spring 155 to be moved into engagement with contact spring 156.

An external circuit connection to the contact springs 153—156 is established by means of certain of the conductors within the cable 157, FIGS. 1 and 4, the remaining conductors within the cable being connected preferably in the manner disclosed on the drawings. The cable 157, it will be noted, is preferably secured to the plate 15 in any convenient manner as by the cable clamp 158, FIG. 5, and screws 159.

On FIG. 21 is shown a mine 161 employing the device of the present invention, the mine comprising a casing 162 having a tapered portion 163 to which is secured a plurality of brackets 164 adapted to support a plurality of fins (not shown) whereby the mine is adapted to be launched, if desired, from an aircraft in flight. The casing is provided with a well 165 within which is arranged a hydrostatically controlled mechanism for extending a detonator 166 into operative relation with respect to an explosive booster charge within a main explosive charge 167, as is well known in the art to which the invention pertains. There is also provided within the mine casing 162 a second well 168 within which is arranged a hydrostatically controlled arming clock 169 of any type suitable for the purpose such, for example, as the arming clock disclosed and claimed in the copending application of James G. Glennon et al., for Firing Mechanism for a Submarine Mine, Serial No. 395,230, filed May 26, 1941, now Patent No. 2,965,088, having a pair of cam controlled contacts 171 and 172 adapted to be closed in the order named in predetermined time delayed relation in response to the operation of the hydrostat 173 after the mine has been planted.

There is also preferably provided within the well 168 a ship counting mechanism 174 of any type suitable for the purpose such, for example, as the counting mechanism disclosed in the copending application of Bernard Woodward, Jr., et al., for Vibration Controlled Mine, Serial No. 528,916, filed March 31, 1944, now Patent No. 2,959,126, in which a plurality of fusible elements corresponding in number to the number of firing signals received thereby are operated in succession in accordance with a predetermined setting of the device, means being provided in the counting mechanism for connecting the detonator to the firing circuit when the predetermined number of firing signals has been received.

The arming and sterilizing device 10 of the present invention may be conveniently located beneath the arming clock 169 within the well 168 and connected as by a cable disposed within the duct 175 to a battery 176 and to firing mechanism 177, which may be of any type suitable for the purpose such, for example, as the firing control mechanism disclosed and claimed in the copending application of Whitman D. Mounce, for Mine Firing Control System, Serial No. 500,399, filed August 28, 1943, and adapted to be controlled by signals received from a search coil 178 arranged within the mine, the firing control mechanism also including means for closing a firing circuit in response to a predetermined change in the magnetic field surrounding the mine and detected by the search coil. The mine 161 is also provided with an aperture within the casing 162 thereof for the introduction of the explosive charge 167 therein and adapted to be closed by a cover 179 secured thereto as by the bolts 181. The mine is also preferably provided with a bracket 182 for securing the mine to the plane prior to the launching thereof.

The operation of the arming and sterilizing device 10 will best be understood from a consideration of FIG. 22, on which is shown in diagrammatic form a complete system employing the device and suitable for use with the mine of FIG. 21. Let it be assumed, by way of example, that the dial 41 is set in an initial position with the zero scale marking thereof in alinement with the mark 44, and the mark 40 on the cam member 28 set opposite the scale marking 17 and the mark 50 on the cam member 31 set opposite the scale division 65, corresponding to arming of the mine at the expiration of a 17 day period and sterilization of the mine at the expiration of a period of 65 days respectively after the mine has been planted. Let it further be assumed that the mine has been released from a mine laying craft and comes to rest on the bed of a body of water of sufficient depth to operate the hydrostatically controlled detonator extending mechanism and the hydrostat 173 associated with the arming clock 169, thereby moving the detonator into operative relation with respect to the explosive booster charge and setting the arming clock 169 in operation respectively. When a predetermined period of time such, for example, as 25 minutes has elapsed after the mine has been planted, the contacts 171 of the arming clock 169 are closed thereby completing a circuit from the positive terminal of battery 176 by way of conductors 183 and 184 to the aforesaid mine firing mechanism. At the expiration of an additional period of time such, for example, as two hours, contacts 172 of the arming clock 169 are moved to closed position thereby closing a circuit from the positive terminal of battery BA, which, for the purpose of description, may be regarded as a portion of the battery 176, by way of conductor 185, contacts 172 of the clock 169, conductor 186, armature of motor 61, from whence the circuit is continued by way of conductor 187, motor control switching mechanism designated generally by the numeral 188, and conductor 189 to the negative terminal of battery BA thereby setting the motor in operation to wind the mainspring of the arming and sterilizing device 10, the motor continuing to operate until the mainspring is wound at the completion of a relatively short period of time such, for example, as 20 seconds.

Figures 14, 15, 16, 17:
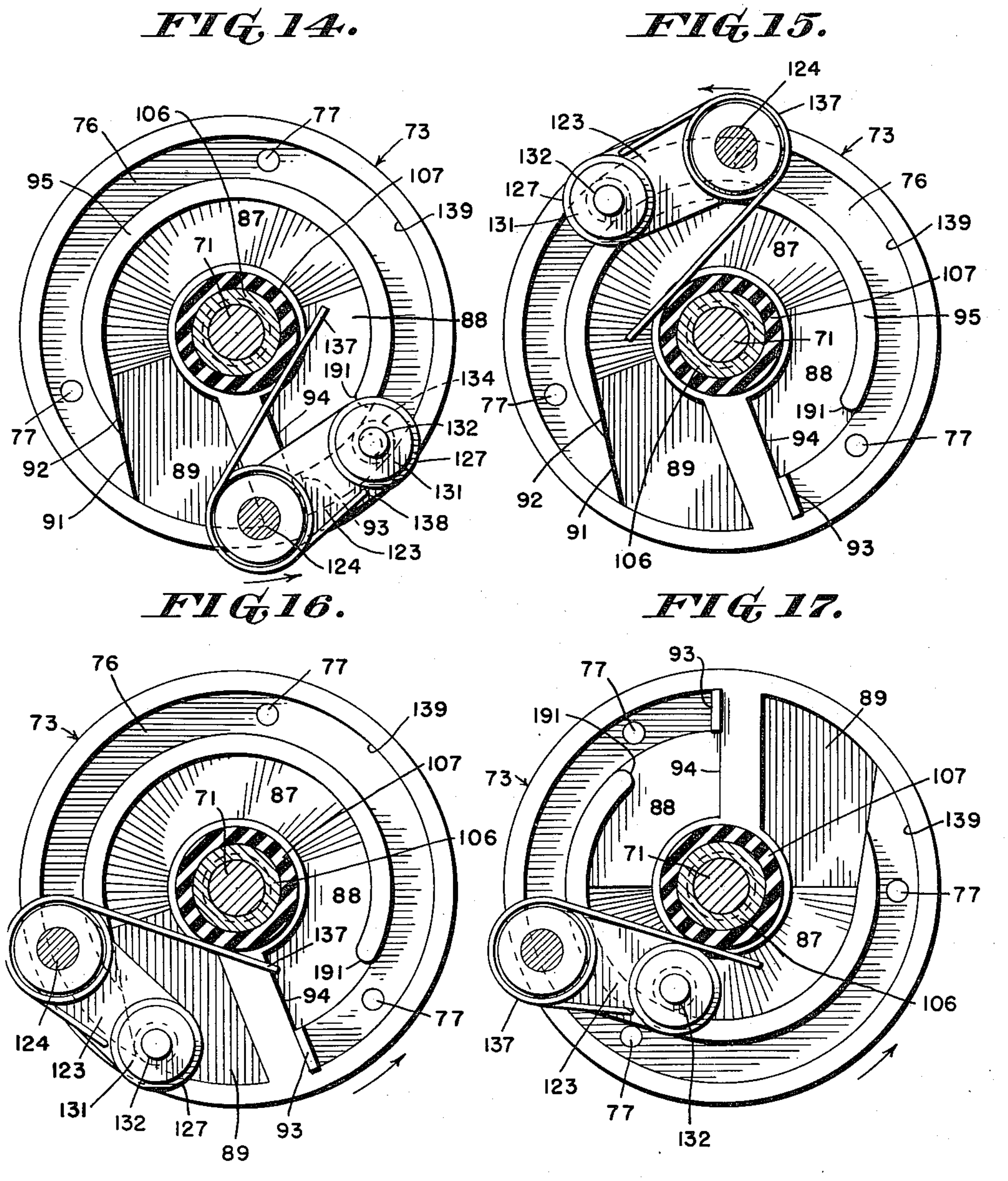

The manner in which the switching control device 188 operates to disconnect the motor at the completion of the winding operation and again set the motor in operation to rewind the mainspring when the mainspring has unwound a predetermined number of turns corresponding to a predetermined period of time such, for example, as 14 hours, will now be described in detail with reference to FIGS. 14 to 17 of the drawings. Referring first to FIG. 14, the operation of the motor causes the contact arm 123 to rotate in the direction indicated by the arrow thereby moving the rod 132 away from the upturned portion 93 of the conducting ring 76 and causing the motor circuit to be continuously maintained until the head 134 of the plunger 132 passes the tapered end 91 of the ring 76. When this occurs, the plunger 132 is moved by the spring 136, FIG. 8, into engagement with the bottom of the recessed portion 89 of the switching device 73 and out of engagement with the ring 76 thereby interrupting the circuit to the motor and bringing the motor and arm 123 to rest.

The mainspring is now rewound and is prevented from unwinding by the pawl 55 and ratchet 56 associated therewith, FIG. 19. The arm 123, it will be recalled, is continuously urged outwardly from the shaft 71 by the spring 137. The arm 123 and plunger 132, however, are gradually forced inwardly toward the shaft 71 by the cam surface 92 as the geared device 73 continues to move in the direction indicated by the arrow, until the inclined portion 87 of the recess within the gear device 73 moves into engagement with the contact 135 of the plunger 132. When this occurs, the plunger 132 is forced into the upstanding portion 127 of the arm 123 as the geared device 73 continues to rotate, additional inward movement of the arm 123 toward the shaft 71 being prevented by the circular baffle section 95. When the geared device 73 has rotated sufficiently for the contact 135 of the plunger 132 to engage the flat portion 88 of the recess within the geared device 73, the contact 135 is at a level with the contact surface of the conducting ring 76. When, as at the completion of the 14 hour period aforesaid, the geared device 73 has moved sufficiently for the enlarged end portion 134 of the plunger 132 to move past the rounded end portion 191 of the baffle section 95, the arm 123 is moved outwardly by the spring 137 into engagement with the annular portion 139 of the geared device 73 with the contact 135 in engagement with the conducting ring 76. When this occurs, the motor operating circuit is again closed and the motor is set into operation to rewind the mainspring. The foregoing cycle of operations is repeated at the expiration the next succeeding 14 hour time interval and at subsequent uniform intervals of time thereafter until the mine has been exploded by a passing vessel or sterilized at the completion of a 65 day period, as the case may be.

At the completion of the period of 17 days after the mine has been planted, the cam member 26 has been moved sufficiently for the contacts of the arming switch 24 to close thereby completing an arming circuit from the mine firing mechanism 177 by way of conductor 192, arming switch contacts 24, conductor 193, contacts 153 and 154 of the heat control relay, conductor 194, fuse 195 of the counting mechanism, from whence the circuit is continued by way of conductor 196 to ground at the negative terminal of battery 176. The mine is now armed.

Whereas in FIG. 22, conductor 194 is connected initially to fuse 195, it will, of course, be understood that this is by way of example only, as the conductor 194 may be initially connected to any of the other fuses of the counting mechanism 174. With the conductor 194 initially connected to fuse 195, as shown, the detonator 166 is adapted to be fired in response to the sixth vessel passing the mine, the passage of the second to the fifth vessel causing the operation of fuses 197, 198, 199 and 200 respectively. As each of the fuses 195 and 197 to 200 is operated, a resilient contact member 201 respectively associated with each of the fuses is moved into engagement with a companion contact member 202, thereby transferring the firing circuit to the next succeeding fuse and, in the event that a sufficient number of vessels have moved past the mine to operate fuse 200 before the mine is sterilized, the firing circuit is transferred to the detonator 166 by the resilient contact member 201 associated with fuse 200.

Let it now be assumed that, at the completion of the 65 day period following the planting of the mine, an insufficient number of closures in the firing circuit have occurred to cause the detonator 166 to operate. At the completion of the 65th day, the cam element 31 has rotated sufficiently for the contacts of the sterilizing switch 25 to be moved to closed position, thereby closing a circuit from the positive terminal of battery BA by way of conductor 185, winding of the heat coil 151 and contacts 203 thereof, conductor 204, sterilizing switch contacts 25, conductor 189, and thence to the negative terminal of battery BA, thereby causing the plunger 148 of the heat control relay to be released and moved by the spring 149 outwardly to an operated position. When this occurs, the contacts 203 of the heat coil are disengaged and the fusible alloy controlling the movement of plunger 148 of the heat control relay is permitted to solidify. As contact 153 of the heat control relay moves away from contact 154, the firing circuit is rendered ineffective henceforth to operate the detonator 166. As contact 155 of the heat control relay moves into engagement with contact 156, a circuit is closed to short-circuit that portion of the battery 176 employed for energizing the firing circuit, and the battery 176 is thus rendered ineffective to cause the mine firing mechanism to fire the mine. The mine is now sterile and may, if desired, be recovered without any danger of accidentally exploding the mine.

Briefly stated in summary, the present invention contemplates the provision of a new and improved self-winding time delay mechanism adapted to operate reliably over a relatively long period of time in which means are provided for operating a pair of circuit control devices at predetermined intervals during the aforesaid relatively long interval of time, and in which the mechanism and arrangement of the parts and instrumentalities employed therewith provides a structure sufficiently rugged to withstand a violent shock or blow without damage or injury thereto and without changing any of the adjustments of the mechanism.

While the invention has been described in detail with reference to the arming and subsequent sterilization of a mine at the expiration of relatively long periods of time after the mine has been planted, many other and varied forms and uses will present themselves to those versed in the art without departing from the invention, and the invention, therefore, is not limited either in structure or in use except as indicated by the terms and scope of the appended claims.

The invention herein described and claimed may be manufactured and used by or for the Government of the United States of America for governmental purposes without payment of any royalties thereon or therefor.

What is claimed as new and desired to be secured by Letters Patent of the United States is:

1. In a self-winding device for arming and sterilizing a mine, in combination, a rotatable shaft having an initial set position, a first cam on said shaft, an arming switch adapted to be closed by said cam when the shaft has rotated through a predetermined angle from said initial position, a second cam on said shaft, circuit closing means controlled by said second cam for sterilizing the mine when the shaft has moved through a predetermined and substantially greater angle from said initial starting position, a spring motor adapted to operate said shaft, means for rewinding the spring motor periodically at regular intervals, and escapement means for retarding the rate of movement of the shaft sufficiently to delay the operation of said arming switch for a predetermined period and to delay operation of said circuit closing means until said rewinding means has performed a predetermined number of operations.

2. A device of the character disclosed for arming and sterilizing a mine, said device comprising a rotatable shaft, a pair of cams rotatably arranged on said shaft, a dial intermediate said cams and in abutting relation therewith, said dial having a plurality of uniformly spaced scale divisions including a zero scale division and indicia therefor corresponding respectively to intervals of time in days required for the cam to rotate from an initial starting position through an angle coincident with any selected scale division, a mark on said device designating said starting position, a pair of reference marks respectively arranged on said cams, means for clamping the cams to the dial with said reference marks respectively opposite a selected pair of scale divisions, means for securing said clamping means to the shaft with said zero scale division opposite said starting mark, and a pair of circuit closing devices on the device adapted to arm and sterilize the mine respectively, said circuit closing devices being adapted to be operated by said cams when a predetermined period of time in days corresponding to the setting of the cams with respect to the dial has elapsed.

3. In a self-winding arming and sterilizing device of the character disclosed, the combination of arming and sterilizing means, means including an escapement mechanism for causing the arming and sterilizing means to be operated at the completion of a predetermined interval of time, means including a mainspring for operating the escapement mechanism and said arming and sterlizing means, an electric motor adapted to rewind the mainspring, a discontinuous annular contact member operatively connected to said mainspring and adapted to be rotated continually in one direction thereby, a rotatable arm adapted to be controlled by said electric motor and having contact means adapted to engage said annular contact member selectively in accordance with the relative position of the arm with respect to the contact member thereby to cause the motor to be operated by said source of electrical power until the mainspring has been rewound, and means for disengaging said contact means from the contact member when the mainspring has been rewound.

4. A control switch for a self-winding mechanism comprising a rotatable shaft, a wheel composed of insulating material and secured to said shaft, means including a mainspring for rotating said wheel, a discontinuous circular contact member recessed within said wheel and coaxial with the axis of rotation thereof, a raised baffle section on said wheel in contiguous abutting relation with a substantially major portion of the inner peripheral surface of said discontinuous contact member, a second wheel rotatably mounted on said shaft and having an arm pivotally secured thereto, means for yieldably urging the arm outwardly from said shaft, a plunger on said arm having an enlarged end portion adapted to engage said circular contact member, means for continuously and yieldably urging the plunger toward said first named wheel, an electric motor adapted to rewind said mainspring, means for causing said second wheel to be actuated by the electric motor while the mainspring is being rewound, a control circuit for said motor including said discontinuous contact member and said plunger, means controlled by the degree of movement of the first named wheel for causing the plunger to engage said circular contact member, means controlled by the degree of movement of said second wheel for disconnecting the plunger from the contact member when the mainspring has been rewound, and means including a cam surface on said first named wheel for moving the plunger toward said shaft into engagement with said baffle section while the spring is being unwound thereby to prevent engagement of the plunger with the contact member until the motor has unwound sufficiently for the baffle section to move out of engagement with the enlarged end portion of said plunger.

5. In a system for arming and sterilizing a mine when a predetermined period of time has elapsed after the mine has been planted, a self-winding time delay mechanism disposed within the mine, means including an electric motor for rewinding said mechanism, a battery, means on said mechanism for connecting the motor to said battery periodically during uniform intervals of time thereby to rewind the mechanism, electroresponsive detonating means, a firing circuit for said detonating means, means adapted to close said firing circuit as a vessel approaches the mine, arming means on said mechanism for preventing the closing of said firing circuit until the rewinding means has made a predetermined number of rewinding operations, and means on said mechanism for short-circuiting the battery thereby to sterilize the mine when the rewinding means has made a predetermined additional number of rewinding operations.

6. In a system for arming and sterilizing a mine when a predetermnied period of time has elapsed after the mine has been planted, a self-winding time delay mechanism disposed within the mine, means including an electric motor for rewinding said mechanism, a battery, means on said mechanism for connecting the motor to said battery periodically during uniform intervals of time thereby to rewind the mechanism, electroresponsive detonating means, a firing circuit for said detonating means, means adapted to close said firing circuit as a vessel approaches the mine, arming means on said mechanism for preventing the closing of said firing circuit until the rewinding means has made a predetermined number of rewinding operations, a heat controlled relay, means on said mechanism for operating the relay when the rewinding means has made a predetermined additional number of rewinding operations, and means on said relay for short-circuiting the battery as the relay operates.

7. In a system for arming and sterilizing a mine when a predetermined period of time has elapsed after the mine has been planted, a self-winding time delay mechanism disposed within the mine, means including an electric motor for rewinding said mechanism, a battery, means on said mechanism for connecting the motor to said battery periodically during uniform intervals of time thereby to rewind the mechanism, electroresponsive detonating means, a firing circuit for said detonating means, means adapted to close said firing circuit as a vessel approaches the mine, arming means on said mechanism for preventing the closing of said firing circuit until the rewinding means has made a predetermined number of rewinding operations, a heat controlled relay, means on said mechanism for operating the relay when the rewinding means has made a predetermined additional number of rewinding operations, means on said relay for short-circuiting the battery as the relay operates, and a pair of normally closed contacts on the relay for interrupting the firing circuit concurrently with the operation of said short-circuiting means.

8. In a system for arming and sterilizing a mine when a predetermnied period of time has elapsed after the mine has been planted, a self-winding time delay mechanism disposed within the mine, means including an electric motor for rewinding said mechanism at regular intervals during said predetermined period of time, a battery, means on said mechanism for connecting the motor to said battery periodically during uniform intervals of time thereby to rewind the mechanism, electroresponsive detonating means, a firing circuit for said detonating means, means adapted to close said firing circuit as a vessel approaches the mine, arming means on said mechanism for preventing the closing of said firing circuit until a predetermined time interval has elapsed, and means on said mechanism for sterilizing the mine when the rewinding means has made a predetermined number of winding operations.

9. A firing system for a marine mine comprising, in combination, a mine firing mechanism having a firing circuit, means responsive to changes in the earth's magnetic field for operating the firing mechanism as a ship moves into proximity with the mine, a source of electrical energy, a device for arming and sterilizing the firing mechanism in predetermined sequence after the mine is launched in a body of water, said device comprising a rotatable shaft having a pair of cams selectively settable at will thereon, an escapement mechanism for controlling the rate of rotation of the shaft, first and second normally open switches individual to said cams and arranged to be closed thereby as the shaft rotates and in predetermined time spaced relation according to the settings of the cams, means including a main spring for rotating the shaft, means including an electric motor for winding said spring, means controlled by the spring for connecting the motor to one side of said source when the spring has unwound a predetermined amount, means controlled by the motor for disconnecting the motor from said side of the source when the spring becomes rewound a predetermined amount, a heat controlled relay adapted to be set in operation as said second switch closes and including a pair of normally closed contacts adapted to be opened as the relay operates, said normally closed contacts and said first switch being connected in series in said firing circuit whereby the firing mechanism is armed and sterilized respectively as the first switch is closed and said normally closed contacts are opened, and switch means including a hydrostatic element for connecting said motor to the other side of said source of power in response to the pressure of the surrounding water thereby to initiate winding of the spring after the mine enters the water.

10. A firing system for a marine mine comprising, in combination, a mine firing mechanism having an initially unarmed circuit, means controlled by magnetic influence as a ship moves into proximity to the mine for initiating operation of the firing mechanism, an electroresponsive detonator arranged to be connected into said circuit whereby the detonator is fired as the firing mechanism is operated, a source of electrical power for operating the firing mechanism, a relay, a pair of normally open contacts connected across said source of power and adapted to be closed by said relay as the relay operates, a pair of normally closed contacts connected in said circuit and adapted to be opened by said relay as the relay operates, a rotatable shaft, means including a spring for rotating said shaft, a pair of cams carried by the shaft and selectively settable at will thereon, first and second normally open switches individual to said cams and adapted to be closed thereby as the shaft rotates and in predetermined sequence according to the settings of the cams, means including an escapement mechanism for rotating the shaft at a predetermined rate, means including an electric motor for winding the spring, a second source of electrical power, means for connecting and disconnecting said motor to and from one side of said second source of power when the spring becomes unwound and wound respectively by predetermined amounts, means including a hydrostatic element for connecting the motor to the other side of said second source of power after the mine enters the water, said first switch being connected in said circuit thereby to arm the firing mechanism when the switch closes, and means including said second switch for operating said relay when the second switch closes thereby to sterilize the firing mechanism.

11. A mine firing system of the character disclosed comprising, in combination, a marine mine, and a device for controlling the time of arming and sterilizing the mine after the mine is launched in a body of water comprising spring driven clock means for measuring intervals of time, a pair of switches mounted on said clock means, means operated by the clock means for closing said switches in predetermined time delayed relation to initiation of operation of the clock means, an electric motor mechanism including a gear train constructed and arranged to wind the clock means when said motor mechanism is energized, means including a hydrostatic switch for initially energizing the motor mechanism after the mine is submerged in a body of water, means controlled by the motor mechanism for deenergizing the motor mechanism as the clock means becomes wound to a predetermined degree, means controlled by the clock means for reenergizing the motor mechanism whenever the clock means becomes unwound to a predetermined degree, electrical means connected to the first of said pair of switches to be closed for arming the mine as said first of the switches is closed, and electrical means connected to the other one of the switches for permanently disarming the mine as said other one of the switches is operated by the clock means.

12. A control switch for a self-winding mechanism comprising a rotatable shaft, a wheel composed of insulating material secured to said shaft, means including a mainspring for rotating said wheel in a predetermined direction, an arcuate contact member mounted on said wheel, a second wheel rotatably mounted on said shaft and having a radially disposed arm pivotally secured thereto, means for yieldably urging the arm outwardly from said shaft and generally tangential to the wheel at the pivotal axis of said arm, a spring loaded cam follower plunger on said arm and having an enlarged end portion disposed to be urged into engagement with said contact member, an electric motor adapted to rewind said mainspring, means including a gear train interposed between said first and second wheels for causing said second wheel to be actuated and rotated in a direction opposite to that of said first wheel by the electric motor while the mainspring is being rewound, a control circuit for said motor including said contact member and said plunger, means including a cam surface adapted to be engaged by said plunger and an arcuate constraining groove controlled in correlation with the degree of movement of the first named wheel for causing the plunger to engage and follow said contact member, and means for effecting a control in correlation with the degree of movement of said second wheel to disconnect the plunger from the contact member when the mainspring has been rewound.

References Cited in the file of this patent

UNITED STATES PATENTS

| | | |
|---|---|---|
| 897,020 | Rupley | Aug. 25, 1908 |
| 913,524 | Leon | Feb. 23, 1909 |
| 1,251,946 | Warren | Jan. 1, 1918 |
| 1,309,427 | Sines | July 8, 1919 |
| 1,438,891 | Boggs | Dec. 12, 1922 |
| 1,491,004 | Duffie | Apr. 22, 1924 |
| 1,538,315 | Duffie | May 19, 1925 |
| 2,399,523 | Van Atta et al. | Apr. 30, 1946 |

FOREIGN PATENTS

| | | |
|---|---|---|
| 739,427 | France | Oct. 25, 1932 |